United States Patent [19]
Proctor et al.

[11] Patent Number: 6,049,537
[45] Date of Patent: Apr. 11, 2000

[54] METHOD AND SYSTEM FOR CONTROLLING SPEECH ENCODING IN A COMMUNICATION SYSTEM

[75] Inventors: Lee Michael Proctor, Cary; James Patrick Ashley, Naperville, both of Ill.

[73] Assignee: Motorola, Inc., Schaumburg, Ill.

[ * ] Notice: This patent is subject to a terminal disclaimer.

[21] Appl. No.: 08/926,074

[22] Filed: Sep. 5, 1997

[51] Int. Cl.[7] .................................................. H04J 13/00
[52] U.S. Cl. .......................... 370/342; 370/252; 370/441; 370/479; 704/221
[58] Field of Search .................................... 370/252, 260, 370/342, 441, 468, 479, 335, 336, 320; 704/206, 207, 208, 221, 222, 223, 231

[56] References Cited

U.S. PATENT DOCUMENTS

| | | | |
|---|---|---|---|
| 4,317,195 | 2/1982 | Barberis et al. | 370/412 |
| 5,363,404 | 11/1994 | Kotzin et al. | 375/1 |
| 5,440,542 | 8/1995 | Proctor et al. | 370/320 |
| 5,519,779 | 5/1996 | Proctor et al. | 380/34 |
| 5,570,363 | 10/1996 | Holm | 370/260 |
| 5,657,420 | 8/1997 | Jacobs et al. | 704/222 |
| 5,703,902 | 12/1997 | Ziv et al. | 370/252 |

*Primary Examiner*—Dang Ton
*Assistant Examiner*—Shick Hom
*Attorney, Agent, or Firm*—Richard A. Sonnentag

[57] ABSTRACT

A method and system for controlling speech encoding in a communication system utilizes feedback information such as packet modification control data (154) sent from a communication link output controller, such as a network arbitor (142). The network arbitor (142) sends the packet modification control data (154) to a selected vocoder (146) to change the filter states of the selected vocoder (146) when the network arbitor (142) modifies an output speech packet communicated of a communication link (20), to facilitate improved convergence of a speech encoder and a speech decoder, such as a mobile subscriber unit.

17 Claims, 9 Drawing Sheets

METHOD AND SYSTEM FOR CONTROLLING SPEECH ENCODING IN A COMMUNICATION SYSTEM

FIELD OF THE INVENTION

The invention relates generally to communication systems having improved data throughput over a limited bandwidth link and more particularly to methods and systems for controlling speech encoding in a communication system.

RELATED APPLICATION

The instant application is related to a co-pending application entitled "Method And System For Controlling An Encoding Rate In A Variable Rate Communication System" having Ser. No. 08/924,602, the same inventors, assigned to the same assignee and filed on the same date.

BACKGROUND OF THE INVENTION

One of the main aims of packet networks and frame relay systems is to maximize the data throughput of a system given a limited bandwidth communication link. In the case of speech information, conventional code division multiple access (CDMA) cellular systems take advantage of the statistical nature of speech to increase the number of channels handled by a given data "pipe". This is particularly the case with CDMA systems where speech coding algorithms in voice coders (vocoders) generate variable speech packet sizes that are directly related to the amount of speech activity at a given time.

As the number of channels is increased, there is an increased occurrence of packet blocking where the data rate of the link is exceeded by the short-term requirements of the speech (voice) packets. The number of channels is typically set at a level where these collisions occur at a statistically low level. When such collisions do occur, speech packets are typically thrown away or bits within a speech packet have to be thrown away to reduce the packet size. This inevitably results in reduced voice quality due mainly to a loss of relevant speech information and to a subsequent divergence of the voice encoder's filter state to the voice decoder's filter state. For example, where a base site controller (BSC) encodes speech in its transcoder as received from a mobile switching center, a mobile subscriber unit receiving the voice has a decoder filter whose states should be similar to the state of the encoding filter to maintain a proper historical record for use by the filters to properly encode and decode voice signals. Where the filter states differ between an encoder and the corresponding decoder, a loss in voice quality can occur over time.

In a conventional code division multiple access cellular radio telephone system, the conventional limited bandwidth communication link which passes the transcoded information is a T1 Megastream link, which, assuming a data traffic transfer rate of 16 Kbps, yields 96 channels. Also in conventional CDMA cellular radiotelephone systems, a centralized base site controller uses the transcoder to transform data at a higher rate into data at a lower rate (and subsequently smaller bandwidth). The lower rate data is called transcoded, or rate adapted data. The data is typically coded in traffic channel packets and are communicated to and from a network arbitor which arbitrates among the traffic channels to select which packets are communicated at which time sequences and at which frequency. A network arbitor interfaces with a network interface to communicate the information coming from the transcoder to a base station. The base station then transmits and receives radio signals with a cellular subscriber unit. However, the network arbitor does not typically communicate back to the vocoders to vary encoding rates or inform the vocoder that speech packets were dropped to avoid bandwidth bottlenecks.

Forms of increasing system capacity by reducing speech encoder rates are known. For example, U.S. patent application Ser. No. 08/575,450 filed Dec. 20, 1995 entitled Method and Apparatus for Controlling Encoding Rate in a Communication System assigned to instant assignee, proposes a system that identifies specific mobile subscriber units as candidates for encoding rate reduction based on link related characteristics from a group of mobile subscriber units. The link related characteristics, include for example the handoff state of the mobile, the location of the mobile with respect to a serving base station or adjacent base stations, transmission characteristics of the mobile and the amount of noise experienced by the mobile. However, the network arbitor in such a system also does not typically communicate back to the variable rate vocoders to vary encoding rates or inform the variable rate vocoder that speech packets were dropped to avoid bandwidth bottlenecks.

Consequently, a need exists for an apparatus and method which facilitates a maximization of the available bandwidth over the communication link while also maintaining a suitable voice quality level during high capacity link usage.

DETAILED DESCRIPTION OF A PREFERRED EMBODIMENT

One embodiment of the disclosed invention utilizes variable rate vocoder related information, such as encoding rate information, sent from each of a plurality of variable rate vocoders, such as variable rate vocoders in a transcoder stage of a base site controller, to a communication link output controller, such as a network arbitor. The communication link output controller then sends a feedback signal to a selected variable rate vocoder to change the encoding rate of the selected variable rate vocoder. The variable rate vocoder related information includes for example rate information and rate desirability information so that the network arbitor can determine a required rate of channel packets that must be communicated over the limited bandwidth communication link. The rate information may be feedforward projected rate data from the variable rate vocoder to the network arbitor.

The network arbitor then compares the required rate to the available rate of the link to determine whether or not a bottleneck will occur. If the network arbitor determines that a bottleneck will occur, a vocoder control signal is generated and sent back to a selected variable rate vocoder to notify the variable rate vocoder to decrease its encoding rate on the current packet so that when encoding is completed the packet will be encoded at a lower rate than initially determined. In this way, the network arbitor generates the vocoder rate control signal to facilitate selective control of the variable rate vocoder prior to the variable rate vocoder completing encoding of a current packet to vary an encoding rate of the current packet prior to the encoding process being completed.

In another embodiment, the network arbitor may additionally and independently modify speech packet data when it determines that a bottleneck may occur. However, in contrast with conventional systems, the network arbitor also communicates to the variable rate vocoder that generated the dropped packet, that the packet was dropped. Consequently, the corresponding variable rate vocoder can adjust its filter states accordingly to reduce divergence so that the encoder and decoder filters converge to improve voice quality over time.

In yet a further embodiment, the network arbitor independently modifies speech packet data when it determines that a bottleneck may occur. However, in contrast with conventional systems, the network arbitor also communicates modification data to the variable rate vocoder that generated the dropped packet, indicating that the packet was modified. Consequently, the corresponding variable rate vocoder can adjust its filter states accordingly to reduce divergence so that the encoder and decoder filters converge to improve voice quality over time.

Figure 1:
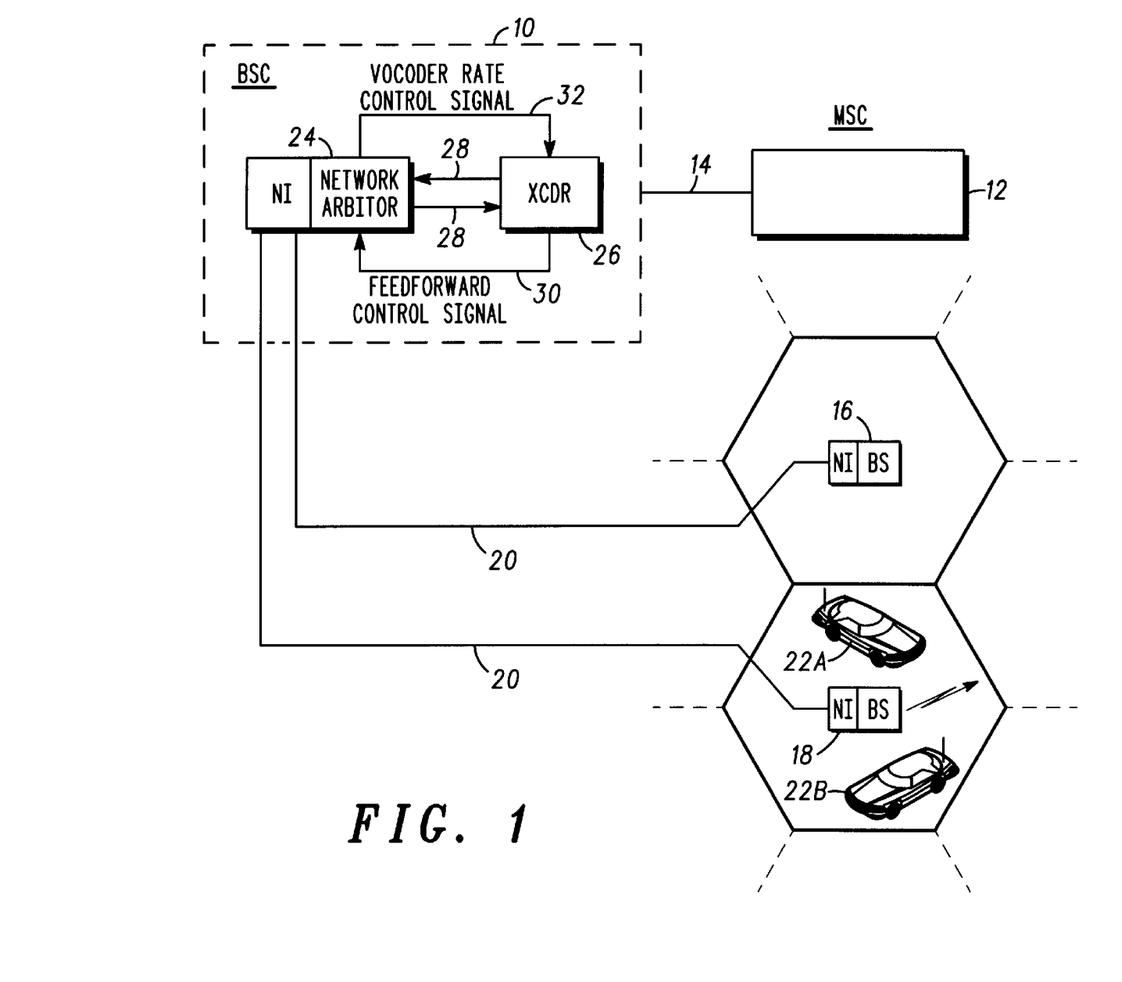
FIG. 1 generally depicts an example of a communication system having a system for controlling an encoding rate in accordance with one embodiment of the invention.

FIG. 1 shows a base site controller 10 in communication with a mobile service switching center (MSC) 12 through limited bandwidth link 14. In the preferred embodiment, the communication system is a code division multiple access (CDMA) cellular radiotelephone system. However, it will be recognized by those of ordinary skill in the art that any suitable communication system may utilize the invention, including other audio communication systems. The mobile service's switching center 12 communicates with a public switch telephone network (not shown). The BSC 10 performs switching functions similar to the MSC 12 but at a location remote with respect to the MSC 12. Base stations 16 and 18 communicate to the BSC 10 through limited bandwidth link 20. The base stations 16 and 18 are capable of communicating with a plurality of mobile stations 22a and 22b.

The base station controller 10 includes a network arbitor 24 in communication with a transcoder 26 for communicating speech packet information 28. The network arbitor 24 receives feedforward data signals 30 over a bus from transcoder 26. The network arbitor 24 determines a required linked bandwidth for transmission of encoded packets of speech based on the feedforward data 30. The network arbitor 24 compares the required link bandwidth with an available link bandwidth to determine the amount of remaining bandwidth for the link. In response, the network arbitor 24 generates a vocoder rate control signal 32 when the required bandwidth exceeds the available bandwidth. The receiving variable rate vocoder controls the encoding rate to facilitate a reduction in bandwidth requirement for the link. Hence the network arbitor 24 selectively controls the encoding rate of at least one variable rate vocoder from the transcoder 26 to facilitate a reduction in required link bandwidth. In this way the BSC 10 utilizes feedforward control data from the transcoder 26 to the network arbitor 24 and in addition incorporates a feedback vocoder rate control signal 32 generated by the network arbitor 24 to selectively control one or more speech encoders to reduce an encoding rate prior to the speech packet of that encoder being transmitted by the network arbitor 24.

Figure 2:
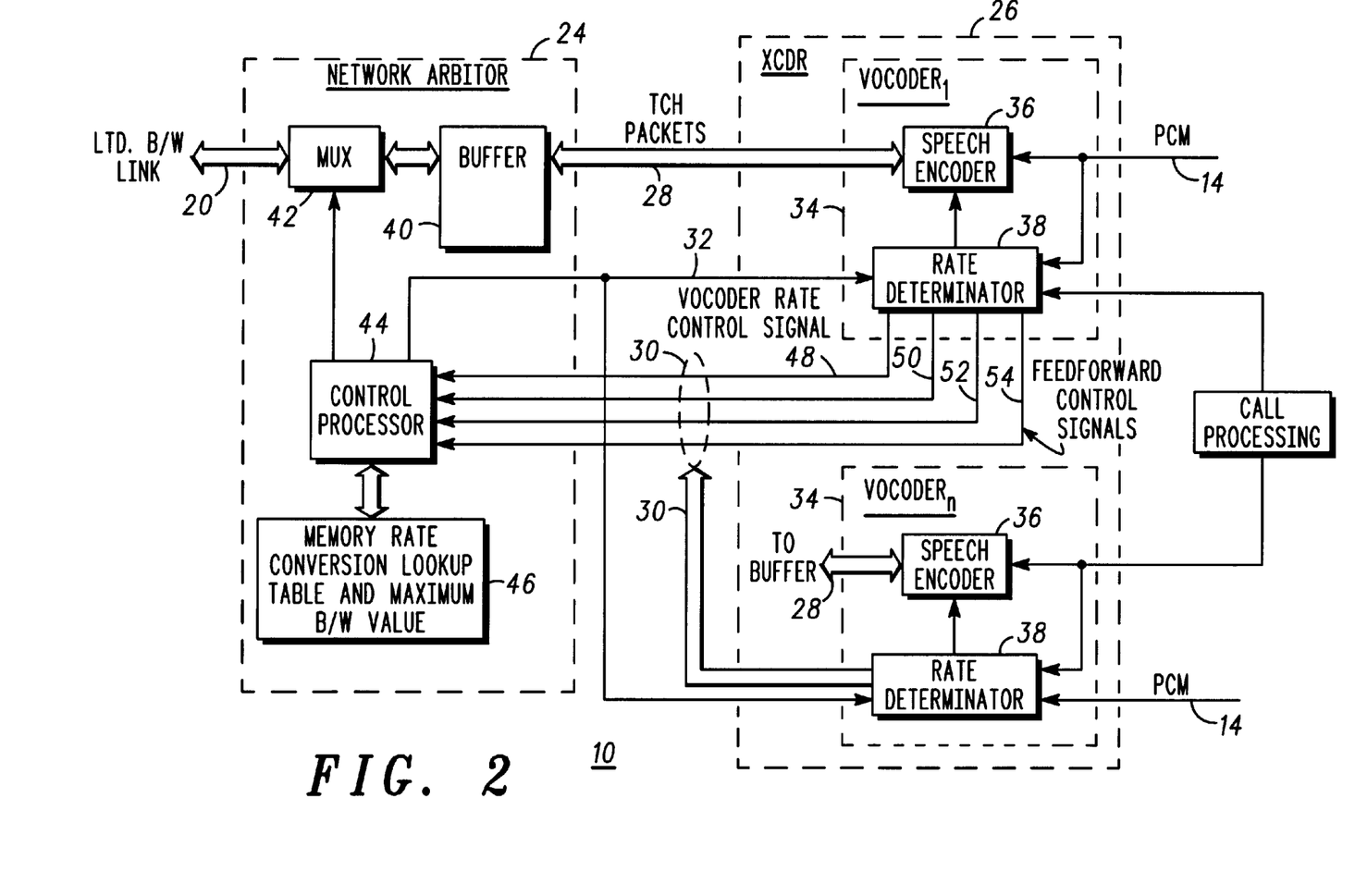
FIG. 2 generally depicts a block diagram of a system for controlling an encoding rate in accordance with one embodiment of the invention.

FIG. 2 shows BSC 10 with the transcoder 26 having a number of variable rate vocoders 34 each with a conventional speech encoder 36 and with a rate determinator stage 38. The speech encoder 36 as known in the art, encodes received speech information 14 and generates and receives traffic channel packets 28. Speech encoders 36 are variable rate encoders. A call processing block sends call signaling control data to the rate determinator stage 38. The call processing block as known in the art, generates among other things, call set up, call tear down commands and power control information. This data is typically multiplexed with encoded speech information and is critical to facilitate proper communication with a mobile unit 22a or 22b.

The network arbitor 24 receives the traffic channel packets 28 in buffer 40. The traffic channel packets 28 are then either transmitted over the limited bandwidth link 20 or received from the limited bandwidth 20 under control of multiplexer 42. The network arbitor 24 also includes a control processor 44 for controlling the multiplexer 42 and for generating the vocoder rate control signal 32 and transmitting the vocoder rate control signal 32 back to each of the variable rate vocoders 34. The network arbitor 24 also has access to memory 46 which may be a database or other suitable memory.

Referring back to rate determinator 38 and variable rate vocoder 34, as with typical rate determinator stages in vocoders, the received voice information is analyzed to determine the rate at which the speech should be encoded by speech encoder 36. However, unlike conventional systems, this rate data is also sent to the network arbitor 24. This rate information is referred to herein as projected rate data 48. The variable rate vocoder 34 through rate determinator 38 transmits the projected rate data 48 to the network arbitor 24 for use by the control processor 44. Preferably, the rate determinator 38 determines the projected speech encoding rate prior to the speech encoder completing the speech encoding process for a given packet. In this way, control processor 44 has ample time to evaluate the projected rate data 48 from each of the vocoders to determine the required bandwidth.

In operation, once the required bandwidth is determined to exceed the available bandwidth, the control processor 44 generates the vocoder rate control signal 32 to selectively control a particular variable rate vocoder. The vocoder rate control signal 32 informs the associated rate determinator 38 to reduce the rate for the particular speech encoder 36 so that the speech encoder 36 can re-encode the same packet prior to transmitting the current speech packet to the network arbitor 24. Hence, the network arbitor 24 receives information from several vocoders and predicts the near-term data rate requirements and compares these requirements to the available or designated link capacity. Each variable rate speech encoder 36 determines their encoding rate early on in the speech encoding process. In response to the vocoder rate control signal, the selected vocoder analyzes a current state of encoding to determine whether re-encoding at a lower encoding rate for a current packet may be suitably accomplished. Moreover higher data rates typically take considerably more processing time to complete before a frame is available. Therefore, the control processor 44 is allowed time to determine which of the vocoders is likely to afford a greater bandwidth reduction benefit by having its encoding rate decreased to maximize the amount of change in bandwidth.

Preferably the control processor 14 determines the available bandwidth by storing a maximum bandwidth value in a lookup table in memory 46. The projected rate data 48 preferably includes vocoder identification bits indicating which vocoder is sending the information and also includes bits representing the projected rate for that particular vocoder. The memory 46 also includes a rate conversion lookup table so that the control processor 44 may cross reference the received projected rate information and determine the number of bits required for transmission. Other suitable command and data techniques may also be used so that a rate conversion table may not be needed. For example, the rate determinator 38 may perform the conversion automatically and send a bit stream indicating the number speech sample bits that are being encoded.

If desired, rate data from the variable rate vocoders may not be sent as feedforward projected rate data, but may be rate data sent contemporaneously as part of a completely encoded traffic channel speech packet 28. In other words, the variable rate vocoders may send encoding rate data as part of the traffic channel packets. In this case, the encoding process is complete for the speech packet and the network arbitor 24 generates the vocoder rate control signal 32 to a selected vocoder to inform the selected vocoder to reduce the rate on a subsequent speech packet from that vocoder. In this way, the network arbitor generates the vocoder rate control signal to facilitate selective control of the vocoder after the vocoder has completed encoding of a packet to vary an encoding rate of a subsequent packet.

In another embodiment, feedforward data 30 may in addition include rate confidence level data 50 which represents a level of confidence that the projected rate data 48 is indicative of a necessary vocoder rate for a given speech packet. The network arbitor 24 receives the rate confidence data 50 from each of the variable rate vocoders 34. Having received projected rate data 48 from all of the vocoders and the rate confidence data 50 from all of the vocoders, the network arbitor selectively controls the vocoder with a lower confidence level and causes that vocoder to decrease its encoding rate. This method provides an improved probability that the vocoder whose rate is being modified is not encoding strong speech signal information. In this way improved voice quality can be maintained with minimized degradation to channels that require a higher encoding rate.

The confidence level data 50 represents how definite the vocoder rate determinator 38 is about the rate decision. The confidence level data 50 preferably ranges from no choice to a borderline condition. For example, the rate determinator 38 may base its estimation on the background noise level as compared to three variable thresholds wherein the three thresholds indicate whether to encode at full rate, half rate, quarter rate or eighth rate. In this arrangement, the confidence level data is based upon the difference between the background noise level and the selected rates lower threshold. For example, in standard IS96A, the rate determinator determines the encoding rate on an estimate of the background noise level Bi that is compared to three variable thresholds (T1, T2 and T3) as shown below:

T3=Full encoding rate
T2=Half encoding rate
T1=Quarter encoding rate
under T1=eighth rate.

As such, if the value of Bi exceeds the threshold T3, the encoding rate is set at full rate. If T1 is exceeded but not T2, the encoding rate is set at quarter rate and so on. Hence for IS96A, a confidence level value (CLV) would be based upon the difference between Bi and the selected rate's lower threshold as follows:

CLV(full rate)=function of (Bi-T3)
CLV(half rate)=function of (Bi-T2)
CLV(quarter rate)=function of (Bi-T1)
CLV(eighth rate)=function of (Bi)

The confidence level is also preferably based on the type of data in a speech packet. For example, if the speech packet includes signaling data from the call processing stages, preferably the rate of the signaling information should not be reduced from a full encoding rate because of the risk of losing the data during transmission from the network arbitor. Consequently, the vocoder assigns a high confidence level to this speech packet. It will be recognized that other confidence level criteria may also be used.

In yet another embodiment, the variable rate vocoder 34 through rate determinator 38, generates and transmits projected arrival time data 52 of a speech packet to facilitate a reduction in bandwidth requirement for the link. The projected arrival time data 52 assists the control processor 44 in determining when the traffic channel packet 28 (encoded) will actually be available for transmission from the buffer 40. This information facilitates in determining the time remaining before encoding is complete. It will be recognized that the projected arrival time data 52 may not be necessary if the control processor 44 of the network arbitor of 24 can calculate or knows the amount of time necessary to complete encoding of a speech packet for a particular variable rate vocoder.

In another embodiment, the feedforward data 30 may include signaling packet data 54 as received by network arbitor 24 from variable rate vocoder 34. The signaling packet data 54 represents a start time of synchronous speech packet transmission from the variable rate vocoder to the network arbitor in a synchronous communication system. It will be recognized however that such signaling packet data may not be necessary in an asynchronous communication system between the network arbitor and transcoder.

Figure 3:
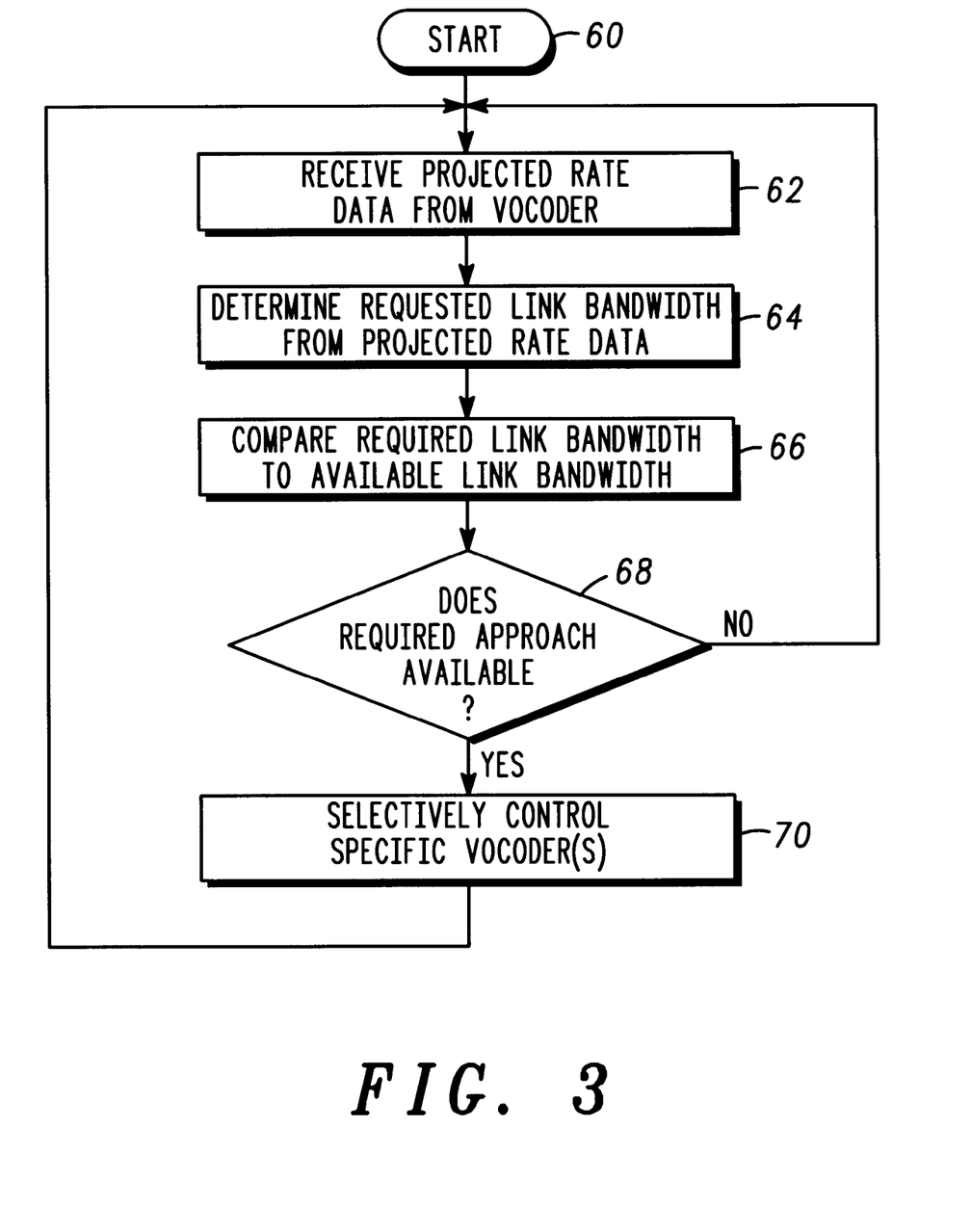
FIG. 3 is a flowchart generally depicting a method of controlling an encoding rate in accordance with one embodiment of the invention.

As shown in FIG. 3, the network arbitor 24 is initialized and the conversion lookup table and maximum bandwidth value is stored in memory 46 as indicated in block 60. The network arbitor 24 receives projected rate data 48 from each of the variable rate vocoders 34 as shown in block 62. With all of the projected rate data 48 from each of the variable rate vocoders, the network arbitor 24 determines the required link bandwidth as indicated in block 64. The determined required link bandwidth is compared to the available link bandwidth value stored in memory 46 as shown in block 66.

If the control processor 44 determines that the required bandwidth is exceeding the available bandwidth as shown in block 68, the control processor 44 generates the vocoder rate control signal 32 to selectively control the vocoder whose speech packet would cause the required bandwidth to exceed the available bandwidth as shown in block 70.

Figure 4:
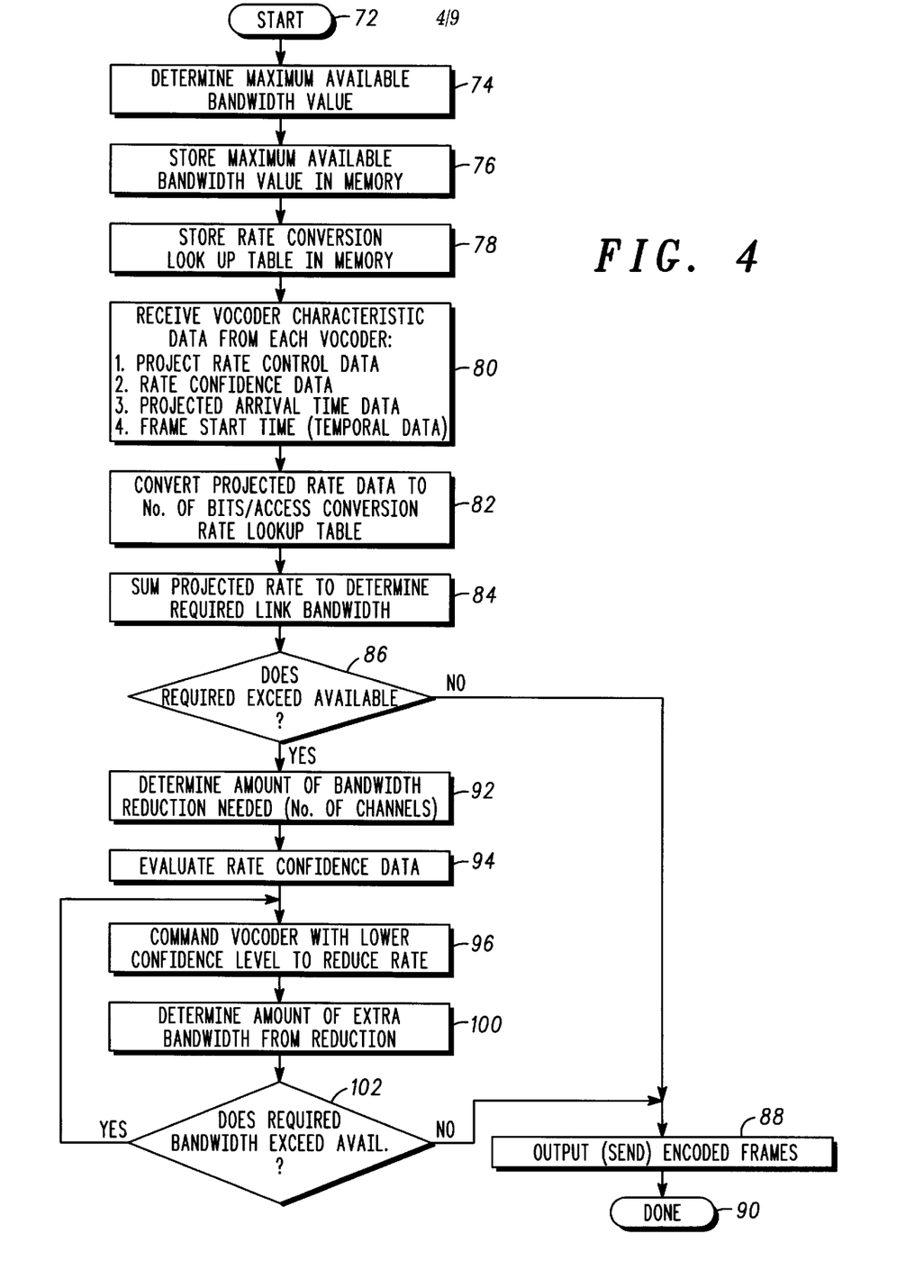
FIG. 4 is a flow diagram depicting in more detail a method for controlling an encoding rate in a communication system in accordance with one embodiment of the invention.

FIG. 4 shows in more detail an operation of the BSC 10. As indicated in block 72 the network arbitor 24 evaluates the bandwidth of link 20. The network arbitor 24 determines the maximum available bandwidth value associated with the limited bandwidth link 20 as shown in block 74. The maximum available bandwidth value is then stored in memory 46 using control processor 44 as indicated in block 76. The control processor 44 also stores the rate conversion lookup table in memory 46 as indicated in block 78. As PCM speech information is received into the speech encoder 36 and rate determinator 38 for each variable rate vocoder 34, the vocoder generates the feedforward data 30 through rate determinator 38. Rate determinator 38 generates the projected rate data 48, and/or the rate confidence level data 50, and/or the projected arrival time 52 and if necessary, the frame start time 54. The feed forward data 30 is received by the network arbitor 24 through control processor 44 as shown in block 80. The control processor 44 first converts the projected rate data 48 to a number of bits by accessing the conversion rate lookup table from memory 46 as shown in block 82. The converted rate data is summed by the control processor 44 to determine the required link bandwidth as shown in block 84 the control processor 44 then determines whether the required link bandwidth exceeds the available link bandwidth by comparing the required link bandwidth to the stored maximum bandwidth value as indicated in block 86. If the required link bandwidth is not exceeding the available bandwidth, the network arbitor transmits or outputs the encoded traffic channel packets for that time as indicated in block 88. When the encoded frames are sent, the process is complete for that frame as shown in block 90.

As shown in block 92, the control processor 44 again determines the required bandwidth and evaluates the rate confidence level data 50 as shown in block 94. Based on the rate confidence level data 50 from each of the vocoders, the control processor 44, through the vocoder rate control signal, commands the vocoder with the lower confidence level to reduce its encoding rate as indicated in block 96. If more than one vocoder must be reduced to obtain a sufficient amount of additional bandwidth, the control processor 44 sequentially commands other vocoders in the order in which the rate confidence level data dictates. Therefore, the network arbitor selectively controls the encoding rate of the vocoder with the lower rate confidence level data compared to rate confidence level data received from other of the variable rate vocoders to decrease the encoding rate of the selected vocoder.

Knowing the projected rate for a given vocoder and knowing the amount of required and available bandwidth, the control processor 44 determines the amount of extra bandwidth that results from the reduction as indicated in block 100. If the required bandwidth still exceeds the available bandwidth as indicated in block 102, the control processor 44 generates the vocoder rate control signal 32 to command the vocoder with the next lowest confidence level as indicated in block 96. If the required bandwidth does not exceed the available bandwidth then the network arbitor 24 continues to evaluate the projected rate data 48 and waits to generate a vocoder rate control signal 32 until additional bandwidth is required.

Also, when the selected vocoder receives the vocoder rate control signal 32, the selected vocoder determines how far along in the current encoding process it is. If the vocoder determines it has time to go back and re-encode at the lower rate, it performs the re-encoding operation on the current packet by recovering the filter state resulting from the previous frame. Lower rate frames typically take less time to encode. They also take less time to send and hence the frame transmission can commence later in time.

Figure 5A:
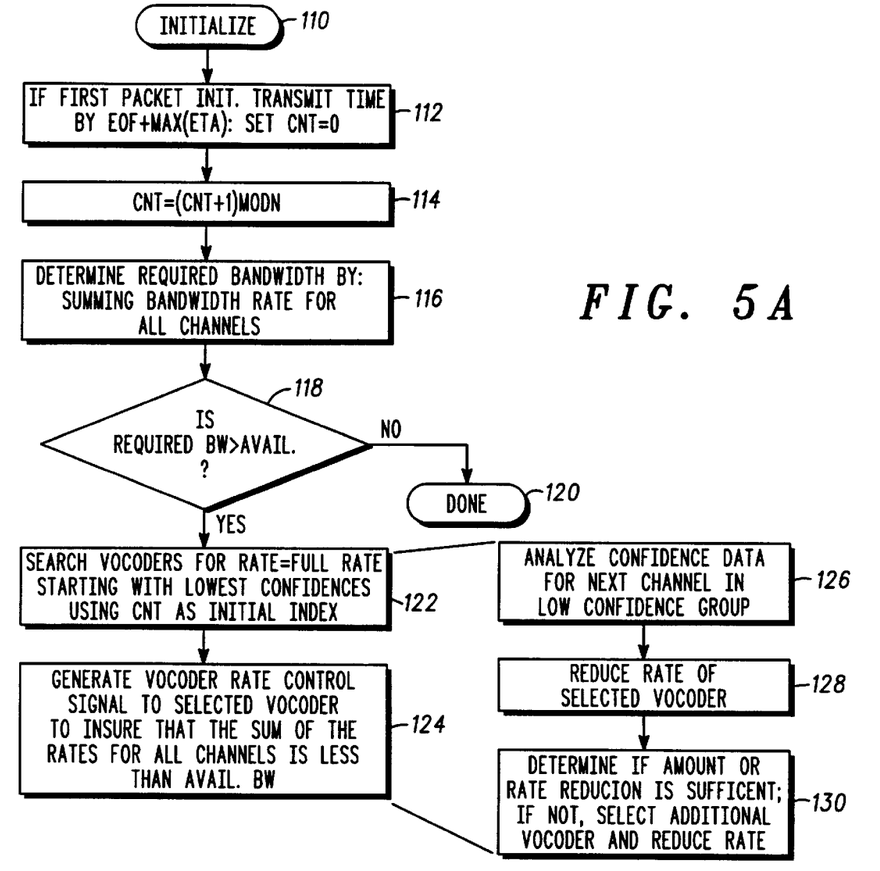
FIG. 5a is a flowchart generally depicting a portion of a method of controlling an encoding rate in a communication system in accordance with one embodiment of the invention.
Figure 5B:
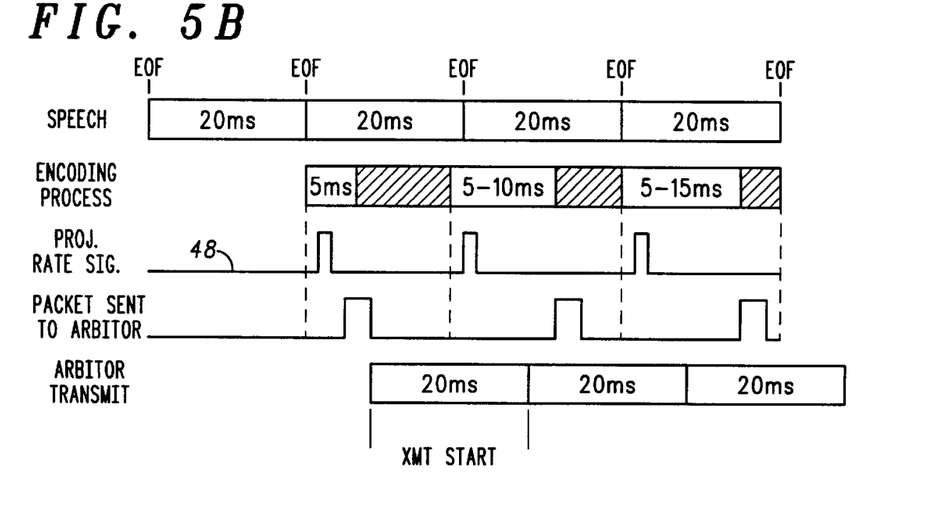
FIG. 5b is a diagram generally representing timing of various signals a system for controlling an encoding rate in accordance with one embodiment of the invention.

Referring to FIGS. 5*a-b*, to carry out the above process the control processor 44 initializes its counters and registers as indicated in block 110. If the control processor 44 determines that a received traffic channel packet is the first packet for a channel, the control processor 44 initializes a transmit time register by the amount of time of an end of frame to occur plus the maximum estimated time of arrival as indicated by the projected arrival time data 52. The internal counter is also set to zero. This is shown in block 112. In block 114, the control processor 44 enables the counter to continue to increment in a mod fashion to perform circular counting as known in the art. As shown in block 116 the control processor determines the required bandwidth by summing the bandwidth rates as determined by the projected rate data 48 for all channels. As shown in block 118 the control processor 44 determines if the required bandwidth is greater than the available bandwidth and does not generate a vocoder rate control signal 32 if additional bandwidth is not required as shown in block 120.

To prioritize variable rate vocoders for rate control, the network arbitor 24 through control processor 44, evaluates the projected rate data 48 to search the variable rate vocoders to determine which variable rate vocoders indicate that they require encoding at full rate. The control processor 44 also evaluates the rate confidence level data 50 and starts with the channel associated with the counter storing the lowest confidences for each sequential channel as indicated in block 122. The network arbitor 24 chooses the variable rate vocoder with the lowest confidence level at full rate as the selected variable rate vocoder. Where no variable rate vocoders are operating at full rate, the network arbitor 24 groups the variable rate vocoders in the next highest rate category, such as half rate, and chooses the half rate variable rate vocoder with the lowest confidence level as the selected variable rate vocoder.

As shown in block 124, the control processor 44 generates the vocoder rate control signal 32 for the selected variable rate vocoder to ensure that the sum of all the channels is less than the available bandwidth. Blocks 122 and 124 are further broken out into blocks 126 through 130 for clarification. As shown in block 126 when searching the variable rate vocoders for the rate information (analyzing the rate data in the projected rate data 48) the control processor 44 analyzes the confidence level data 50 for the next channel in the low confidence group previously stored from the search. The vocoder rate control signal 32 is generated for the selected variable rate vocoder based on the variable rate vocoder with the lowest confidence level out of the group as shown in block 128. If the amount of rate reduction is not sufficient to allow proper transmission of encoded data, the control processor 44 selects an additional variable rate vocoder and reduces the rate of the additional variable rate vocoder as indicated in block 130.

As shown in FIG. 5*b*, generation and transmission of the timing for the vocoder rate control signal 32 preferably occurs prior to completion of the encoding process for the given speech packet. For example, out of a speech frame that may be twenty milliseconds long the encoding process for contained speech packets may vary between 5 to 15 milliseconds depending upon whether the encoding is at full rate, half rate, quarter rate or eighth rate. The projected rate signal 48 is generated by the variable rate vocoder shortly after the speech encoder 36 commences the encoding process. The network arbitor 24 sends the vocoder rate control signal 32 after receiving the projected rate signal 48 but prior to the completion of encoding so that the speech encoder 36 may re-encode the speech packet prior to being sent to the network arbitor 24.

As such the network arbitor 24 uses the early knowledge of the rate and expected time frame arrival as well as fixed information such as maximum allowable data holding time to predict if its going to run out of its limited bandwidth. The network arbitor commands the variable rate vocoders using the feedback vocoder rate control signal, to limit the rate of the next frame. The selected variable rate vocoder depends on the predicted arrival time of the next frame, based on the reception of the previous frame and time alignment. In addition, the network arbitor commands one or more variable rate vocoders to lower the rate of their current frame when there is sufficient time for the variable rate vocoder to re-encode the packets. The selected variable rate vocoder is based upon the level of confidence data. However, to minimize disruption to a particular voice channel commands are issued to the same variable rate vocoder in consecutive frames only when absolutely necessary.

Figure 6:
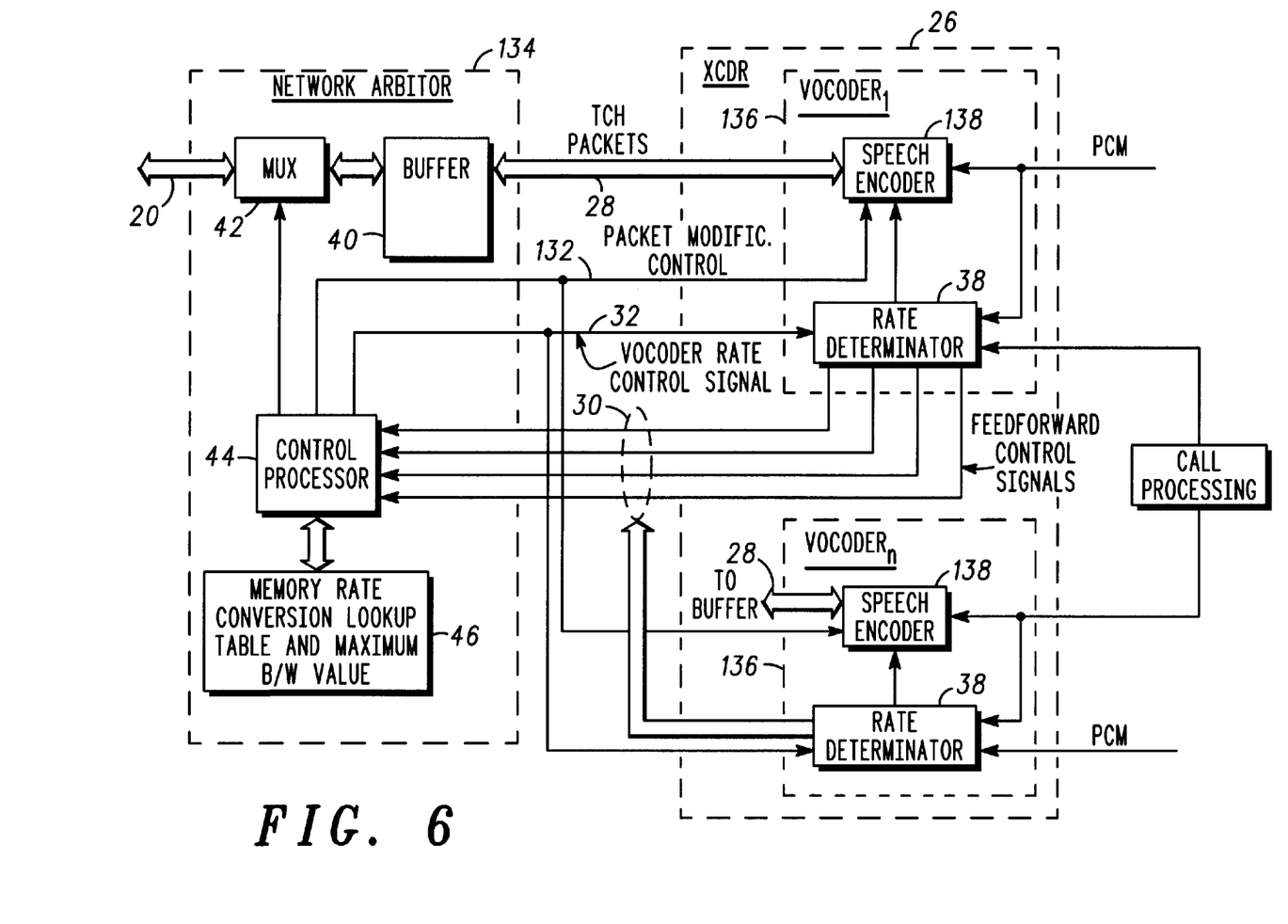
FIG. 6 is a block diagram generally depicting another embodiment of a system for controlling an encoding rate in a communication system which includes an additional network arbiter control mechanism for selectively controlling a speech encoder in accordance with another embodiment of the invention.

FIG. 6 shows yet another embodiment which is the same embodiment as shown in FIG. 2 except for the addition of a packet modification control signal 132 which is independently generated by the network arbitor 134 when there is insufficient time for the speech encoder 36 to re-encode the speech packet and the network arbitor 134 independently modifies a received speech packet from the variable rate vocoder 34. When the network arbitor 134 modifies a speech packet by discarding frames or bits, it communicates the information back to the variable rate vocoder that sent the speech packet so that the variable rate vocoder's filter states can be updated appropriately to avoid divergence between the filters of variable rate vocoder and corresponding decoder in a mobile unit. The packet modification control signal 132 indicates whether the output encoded speech output over the limited bandwidth link 20 was modified by the network arbitor 134 prior to output. Therefore the packet modification control signal 132 includes for example, channel data indicating the channel and data indicating that the packet was discarded or that the packet was rate reduced. The variable rate vocoder 136 receives the packet modification control signal 132 through speech encoder 138. The variable rate vocoder 136 then controls the speech encoder 138 to modify its filters consistent with the discarding of the information.

As with network arbitor 24 in FIG. 2, the network arbitor 134 receives rate data from the plurality of variable rate vocoders 138. The rate data may be projected rate data from feedforward data 30 or contemporaneous rate data embedded in encoded traffic channel speech packets 28. The network arbitor 134 determines the required link bandwidth for transmission of encoded packets of speech based on the rate data. The network arbitor 134 compares the required link bandwidth with an available link bandwidth obtained from memory. When ample time exists for the variable rate vocoder to reduce the encoding rate of a current speech packet, the network arbitor selectively controls the encoding rate of that variable rate vocoder in response to the comparison through vocoder rate control signal 32.

The network arbitor then outputs the encoded speech over the link. Where ample time does not exist for the selected variable rate vocoder to vary the encoding rate, the network arbitor modifies the output speech packet by discarding received speech packet information from the variable rate vocoders and/or reducing speech packet rate information by eliminating bits in the speech packet. The network arbitor then generates the packet modification control signal 132 for the selected variable rate vocoder indicating whether the output encoded speech was modified prior to output. This is done based on the modification. The network arbitor transmits the packet modification control signal to control the selected variable rate vocoder, in response to the packet modification control signal, when output encoded speech was modified.

The speech encoder 138 receives the packet modification control signal 132 and recovers a previous speech packet that was discarded and updates its filter state data for use in generating a subsequent speech packet. The speech encoder 138 may use filter update techniques such as those commensurate with IS96A, available from Electronics Industries Association/Telecommunications Industries Association, Engineering Publications Office, 2001 Pennsylvania Avenue, Washington, D.C. 20006 or disclosed in U.S. Pat. No. 5,519,779 assigned to instant assignee. When the modification to the speech packet is a result of discarding a speech packet, the speech encoder 138 decays speech parameters for subsequent speech packets in response to the packet modification control signal 132.

When the speech packet modification resulted from reducing a speech packet output rate, the speech encoder 138 varies a rate of encoding for the subsequent speech packet by applying a packet reduction method to the subsequent packet. The packet reduction method may be of the type described in U.S. Pat. No. 5,519,779, entitled "Method and Apparatus for Inserting Signaling in a Communication System" and assigned to instant assignee.

In yet another embodiment, if the selected variable rate vocoder does not have sufficient time to re-encode a current speech packet, then the variable rate vocoder continues processing at the original selected rate and then applies a rate reduction method such as that described in U.S. Pat. No. 5,519,779 incorporated herein by reference, and updates its filter states accordingly.

As seen, one embodiment of the disclosed invention facilitates a reduction in bandwidth requirement by using feedforward information of vocoder rate data to a network arbitor. The network arbitor predicts the occurrence of bandwidth bottlenecks by calculating the short-term data requirements and comparing them with the available capacity. The network arbitor also determines what action should be taken if bandwidth bottleneck is predicted. In addition, if the network arbitor discards information or otherwise modifies a packet, on a particular traffic channel, the network arbitor communicates the nature of the action to the appropriate variable rate vocoder so that the variable rate vocoder may update its filters accordingly. The system facilitates re-encoding at a lower rate than originally calculated by the rate determination algorithm to reduce link bandwidth requirements.

Figure 7:
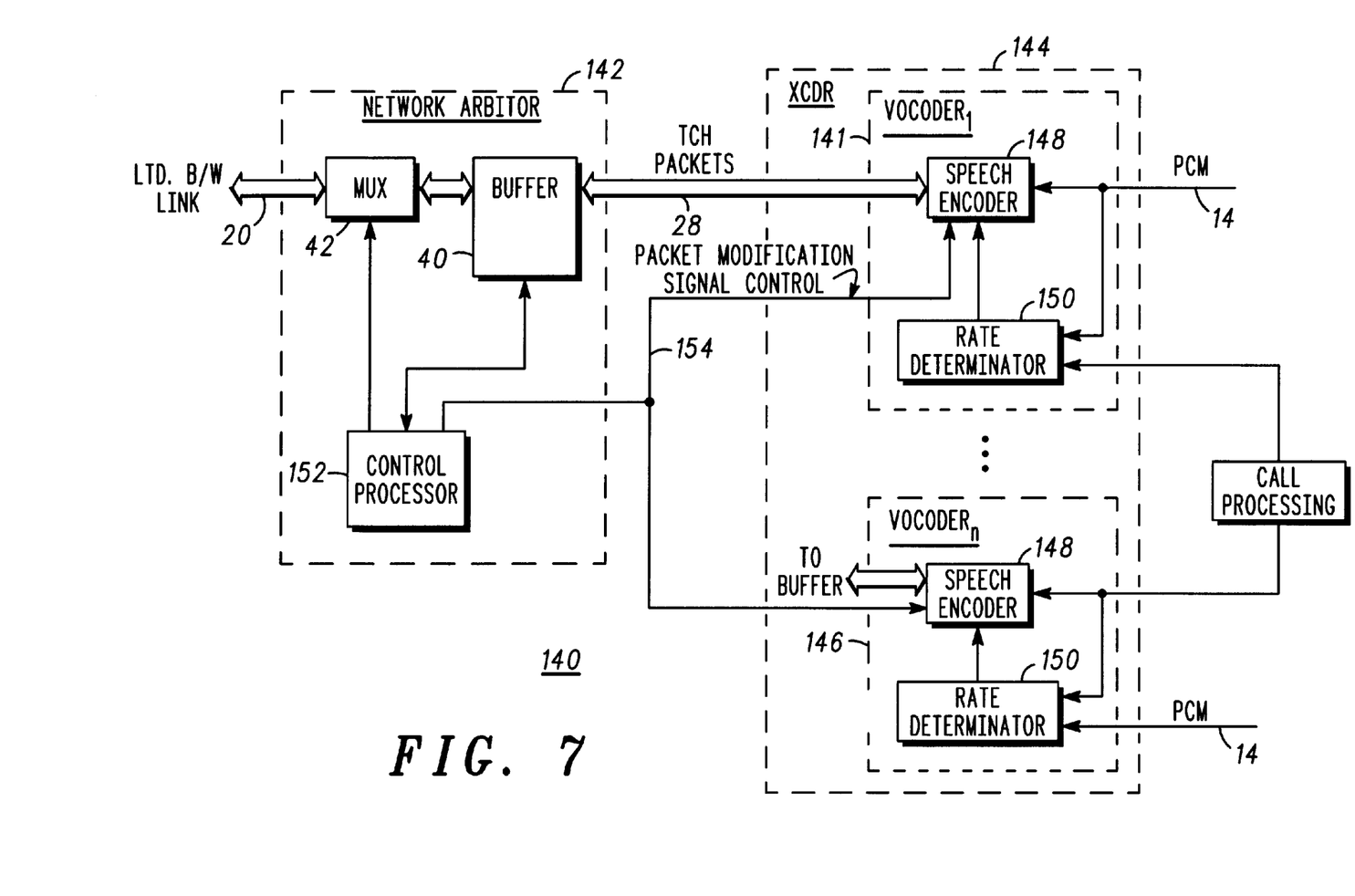
FIG. 7 depicts a block diagram of another embodiment of the invention wherein a packet modification control signal is sent from the network arbitor to the transcoder when modification to a speech packet has been made by the network arbitor.
Figure 8A:
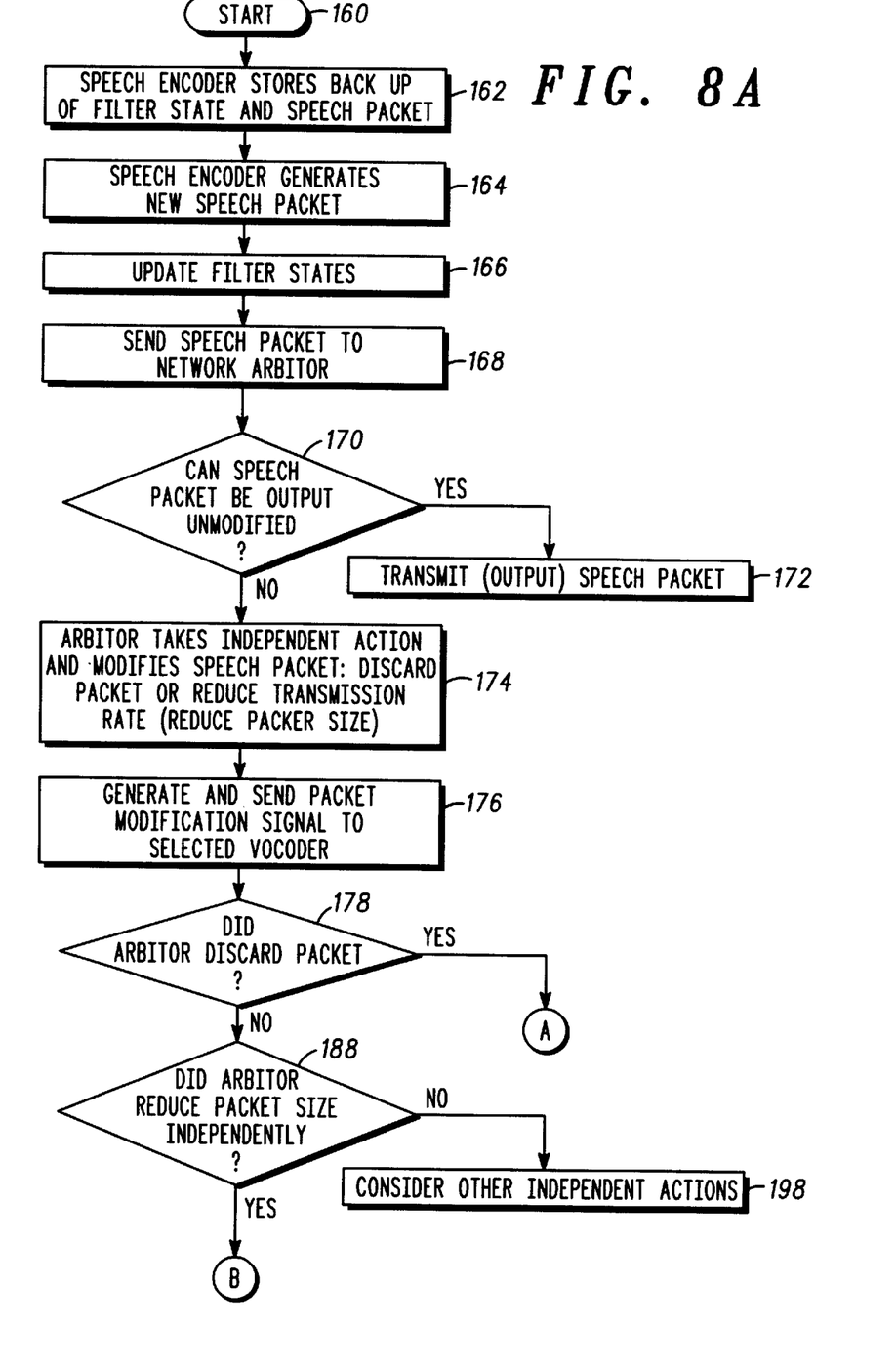
FIGS. 8a-b are flow diagrams generally depicting the operation of the system of FIG. 7.
Figure 8B:
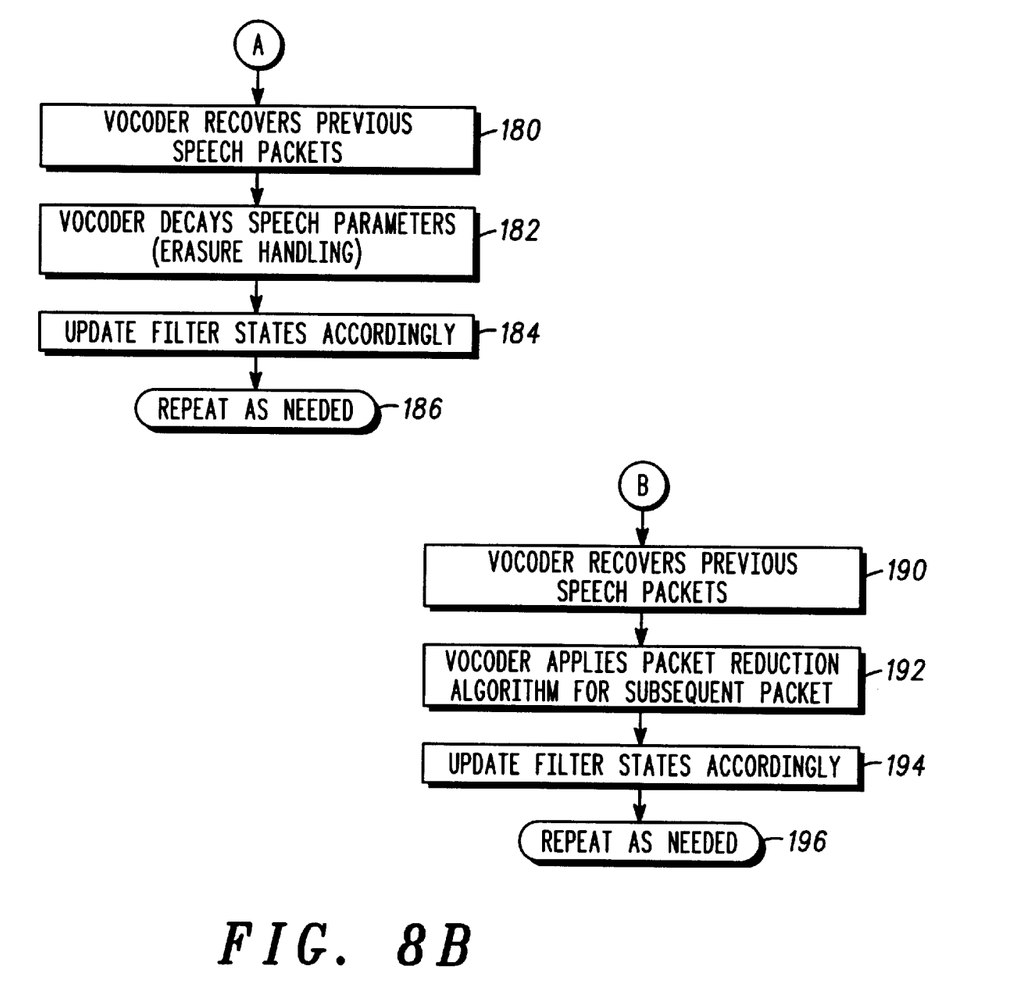

An embodiment of another type of bandwidth control system is shown in FIGS. 7, 8a and 8b. A communication system 140 has the same components as the system of FIG. 6, except for the feedforward data 30 and the vocoder rate control signal 32. Hence, the system 140 does not generate a feedback rate control signal to vary the encoding rate of the variable rate vocoders but independently modifies packets and attempts to maintain convergence between the encoder and decoder by providing information back to the encoder about how output packets were modified. The operation of the packet modification and filter update techniques of the system 140 is identical to the packet modification and filter update techniques as described with reference to the system of FIG. 6.

Accordingly, the system 140 includes a network arbitor 142 which communicates with the transcoder 144. The transcoder 144 includes a number of vocoders generally indicated at 146 with each vocoder having a speech encoder 148 and a rate determinator 150. The network arbitor 142 also includes a control processor 152 which generates a packet modification control signal for a selected variable rate vocoder 146 indicating whether outputted encoded speech on link 20 was modified prior to output. Each vocoder controls its internal filters in response to the packet modification control signal when outputted encoded speech from that speech encoder was modified by the network arbitor 142 in the same way as previously described with reference to FIG. 6. Preferably, the network arbitor 142, through control processor 152, generates the packet modification control signal 154 based on the modification of speech packets resulting from the network arbitor 142 discarding a speech packet and/or reducing a speech packet rate by reducing the number of bits in a speech packet prior to output on the limited bandwidth link 20.

The network arbitor 142 may take the independent action of modifying a speech packet, such as discarding speech packet information or reducing a speech packet rate when it determines from the channel packet data 28 that the amount of information will exceed the limited bandwidth of link 20. The determination of whether a bottleneck will occur may be determined as with conventional network arbitors. However, in contrast with conventional network arbitors the network arbitor 142 sends back the packet modification information via packet modification control signal 154 to the speech encoder whose packet was discarded or whose speech packet rate was reduced when output over the link 20. In this way, the encoder controlled by the base station controller and the decoder in the mobile subscriber unit can maintain similar filter states to prevent divergence of filtering processing during a call.

In operation, the system 140 receives encoded speech packets 28 from the plurality of variable rate vocoders 148 and determines a required link bandwidth for transmission of encoded packets of voice based on the received encoded speech packets. The network arbitor 142 compares the required link bandwidth with an available link bandwidth and outputs encoded speech over the link 20. When the network arbitor 142 compares the required link bandwidth with the available link bandwidth and finds that the required link bandwidth exceeds the available link bandwidth, the network arbitor 142 discards the required number of speech packets or reduces the speech packet rate for a particular speech packet to ensure that there is sufficient bandwidth for the output encoded speech on link 20.

When modification to a speech packet occurs, the network arbitor 142 generates the packet modification control signal 154 for a selected variable rate vocoder 148 whose speech packet was modified. In contrast to conventional communication systems, speech coders typically do not know whether the encoded speech was actually transmitted and decoded by a decoder, however in the instant invention the information indicative that the encoded speech packet was not communicated over the link is sent back to the speech encoder so that the speech encoder may make corresponding changes to its filter states for the subsequent speech packets encoded for that channel. The independent control of the network arbitor to discard or modify speech packet information rate helps to maintain the historical compatibility between speech encoder and corresponding decoder for a channel whose receiving the speech packet from that encoder.

FIGS. 8a and 8b show the operation of the system 140 starting in block 160 where speech encoder 148 encodes a speech packet and transmits the packet through link 28 to buffer 40. The speech encoder 148 also stores in its memory, a backup representation of the filter states for a transmitted speech packet and the speech packet itself as indicated in block 162. As shown in block 164, speech encoder 148 generates a new speech packet and updates its filter states accordingly as show in block 146. The speech encoder then sends the speech packet to the network arbitor 142 as shown in block 168.

Next, the network arbitor 142 through control processor 152 determines whether or not there is an available bandwidth to output the speech packet without modification as indicated in block 170. If no modification to a speech packet is necessary, the network arbitor 142 transmits (outputs) the speech packet over limited bandwidth link 20 as shown in block 172. If the speech packet can not be output due to limited bandwidth, the network arbitor 142 takes independent action and modifies the speech packet as indicated in block 174. The speech packet may be modified for example by discarding the packet or reducing the transmission rate of the speech packet by reducing the packet size. Once a modification to a given speech packet has occurred, the network arbitor 142 generates and sends the packet modification control signal 154 to a selected vocoder corresponding to the vocoder whose speech packet was modified as shown in block 176.

The packet modification control signal 154 may be a bit stream containing bits representing a vocoder and bits representing a speech packet so that a single packet modification control signal 154 may be sent to all vocoders but each vocoder determines whether or not the modified speech packet was encoded by it based on the vocoder identification data. It will be recognized by those of ordinary skill in the art that any suitable data command structure may be used for the packet modification control signal. The data in the packet modification control signal 154 indicates whether the network arbitor 142 discarded the speech packet or reduced the packet size independently.

As shown in block 178, if the network arbitor 142 modified a speech packet by discarding a speech packet, the vocoder whose speech packet was modified recovers the previous speech packet as shown in block 180. The vocoder then decays the speech parameters for the previous speech packet (performs eraser handling) as shown in block 182. This may be done in accordance with vocoder specifications set forth in IS96A. The vocoder then has the speech encoder update the filter states to reflect the decayed speech parameters as indicated in block 184. This process is repeated as needed for each speech packet that has been discarded as shown in block 186. By updating the filters by decaying the speech parameters and updating the filter states accordingly, the speech encoder is kept at a similar filter state as the decoder receiving speech packet information, thereby keeping the historical filter information relatively consistent between the encoder and decoder.

If the network arbitor 142 modified a speech packet by reducing the speech rate or reducing the packet size as shown in block 188, the vocoder whose speech packet was reduced in size recovers the previous speech packet as shown in block 190. The vocoder then applies a packet reduction algorithm for subsequent packets as shown in block 192. The packet reduction method may be of the type described in U.S. Pat. No. 5,519,779, entitled "Method and Apparatus for Inserting Signaling in a Communication System" and assigned to instant assignee or other suitable technique. The vocoder then updates the filter states according to the packet reduction algorithm as shown in block 194 and the packet reduction algorithm is repeated for each packet whose rate has been reduced by the network arbitor 142 as shown in block 196. Again, in this way the subsequent speech packets encoded by a selected speech encoder will more closely represent the speech packet information received by the corresponding decoder at the mobile subscriber unit. Referring back to block 188, if the network arbitor did not reduce the packet size independently, the vocoder considers other independent actions as indicated in block 198 that had been taken by the network arbitor. The other independent actions are identified in the data of the packet modification control signal and include discarding, rate reduction, a combination thereof or other independent actions which may be so defined depending upon the desired implementation.

In summary, the notified variable rate vocoder recovers a previous speech packet that was discarded and updates filter state data for use in generating a subsequent speech packet. When speech packets are discarded, the selected vocoder decays speech parameters for use in generating subsequent speech packets, in response to the packet modification control signal. When the network arbitor varies the output rate of a speech packet, the selected vocoder varies a rate of encoding for the subsequent speech packet, in response to the packet modification control signal.

It should be understood that the implementation of other variations and modifications of the invention in its various aspects will be apparent to those of ordinary skill in the art, and that the invention is not limited by the specific embodiments described. Although described with particular reference to a cellular CDMA radiotelephone system, the invention may be applicable to other audio related systems. Therefore the term speech packet used here includes any audio signal even if not speech. Also, the network arbitor and vocoders may be at different locations or multiplexed with other network arbitors or sets of vocoders. It is therefore contemplated to cover by the present invention, any and all modifications, variations, or equivalents that fall within the spirit and scope of the basic underlying principles disclosed and claimed herein.

What we claim is:

1. A method of controlling speech encoding in a communication system, the method comprising the steps of:
   receiving encoded speech packets from a plurality of variable rate vocoders;
   determining a required link bandwidth for transmission of encoded packets of voice based on the received encoded speech packets;
   comparing the required link bandwidth with an available link bandwidth;
   outputting encoded speech over the link;
   generating a packet modification control signal for a selected variable rate vocoder indicating whether the output encoded speech was modified prior to output; and
   controlling the selected vocoder, in response to the packet modification control signal, when output encoded speech was modified.

2. The method of claim 1 wherein the step of generating the packet modification control signal is based on a modification resulting from discarding speech packet information and/or reducing speech packet information rate.

3. The method of claim 2 wherein the step of controlling the selected vocoder includes recovering a previous speech packet that was discarded and updating filter state data for use in generating a subsequent speech packet.

4. The method of claim 3 wherein the step of controlling includes facilitating decaying of speech parameters for use in generating subsequent speech packets, in response to the packet modification control signal, when the modification resulted from discarding speech encoded information.

5. The method of claim 2 wherein the step of controlling includes varying a rate of encoding for the subsequent speech packet, in response to the packet modification control signal, when the modification resulted from reducing a speech packet output rate.

6. The method of claim 4 wherein the communication system is a CDMA system and a network arbiter generates the packet modification control signal for the selected variable rate vocoder indicating whether the output encoded speech was modified prior to output.

7. The method of claim 5 wherein the step of controlling further includes applying a packet reduction method for a subsequent packet, when the modification resulted from reducing a speech packet output rate.

8. A method of controlling speech encoding in a communication system, the method comprising the steps of:
   receiving encoded speech packets from a plurality of variable rate vocoders;
   determining a required link bandwidth for transmission of encoded packets of voice based on the received encoded speech packets;
   comparing the required link bandwidth with an available link bandwidth;
   outputting encoded speech over the link;
   generating a packet modification control signal for a selected variable rate vocoder indicating whether the output encoded speech was modified prior to output by discarding speech packet information and/or reducing speech packet information rate; and
   controlling the selected vocoder, in response to the packet modification control signal, when output encoded speech was modified by:
      recovering a previous speech packet that was discarded and updating filter state data for use in generating a subsequent speech packet;
      facilitating decaying of speech parameters for use in generating subsequent speech packets, in response to the packet modification control signal, when the modification resulted from discarding speech encoded information; and
      varying a rate of encoding for the subsequent speech packet, in response to the packet modification control signal, when the modification resulted from reducing a speech packet output rate.

9. The method of claim 8 wherein the communication system is a CDMA system and a network arbiter generates the packet modification control signal for the selected variable rate vocoder indicating whether the output encoded speech was modified prior to output.

10. A system for controlling speech encoding in a communication system comprising:
    means for receiving encoded speech packets from a plurality of variable rate vocoders;
    means for determining a required link bandwidth for transmission of encoded packets of voice based on the received encoded speech packets;

means for comparing the required link bandwidth with an available link bandwidth;

means for outputting encoded speech over the link;

means, responsive to the output encoded speech, for generating a packet modification control signal for a selected variable rate vocoder indicating whether the output encoded speech was modified prior to output; and means, responsive to the packet modification control signal, for controlling the selected vocoder when output encoded speech was modified.

11. The system of claim 10 wherein the means for generating the packet modification control signal generates the packet modification control signal based on a modification resulting from discarding speech packet information and/or reducing speech packet information rate.

12. The system of claim 11 wherein the means for controlling facilitates recovery of a speech packet corresponding to a speech packet that was discarded and updates filter state data for use in generating a subsequent speech packet.

13. The system of claim 12 wherein the means for controlling facilitates decaying of speech parameters for use in generating subsequent speech packets, in response to the packet modification control signal when the modification resulted from discarding speech encoded information.

14. The system of claim 11 wherein the means for controlling varies a rate of encoding for the subsequent speech packet, in response to the packet modification control signal when the modification resulted from reducing a speech packet output rate.

15. The system of claim 13 wherein the communication system is a CDMA system and a network arbiter generates the packet modification control signal for the selected variable rate vocoder indicating whether the output encoded speech was modified prior to output.

16. A system for controlling speech encoding in a communication system comprising:

a network arbiter having, means for receiving encoded speech packets from a plurality of variable rate vocoders;

means for determining a required link bandwidth for transmission of encoded packets of voice based on the received encoded speech packets;

means for comparing the required link bandwidth with an available link bandwidth;

means for outputting encoded speech over the link; and means for generating a packet modification control signal for a selected variable rate vocoder indicating whether the output encoded speech was modified prior to output by discarding speech packet information and/or reducing speech packet information rate; and wherein the system further has, means, responsive to the packet modification control signal, for controlling the selected vocoder when output encoded speech was modified wherein the means for controlling recovers a previous speech packet that was discarded and updating filter state data for use in generating a subsequent speech packet; facilitates decaying of speech parameters for use in generating subsequent speech packets, in response to the packet modification control signal, when the modification resulted from discarding speech encoded information; and varies a rate of encoding for the subsequent speech packet, in response to the packet modification control signal, when the modification resulted from reducing a speech packet output rate.

17. The system of claim 16 wherein the communication system is a CDMA system and a network arbiter generates the packet modification control signal for the selected variable rate vocoder indicating whether the output encoded speech was modified prior to output.

* * * * *